3,488,409
PROCESS FOR CONSOLIDATING NUCLEAR
FUEL PARTICLES
Hans Beutler, Robert L. Hamner, and J. M. Robbins, Oak Ridge, Tenn., assignors to the United States of America as represented by the United States Atomic Energy Commission
No Drawing. Filed Nov. 8, 1967, Ser. No. 681,574
Int. Cl. G21c 21/00, 3/02
U.S. Cl. 264—.5    4 Claims

ABSTRACT OF THE DISCLOSURE

An improved process for consolidating discrete fissionable nuclear fuel particles, which are coated with a first, high density coating selected from silicon carbide or anisotropic pyrolytic carbon, into a carbon-graphite matrix nuclear fuel composite is provided wherein an outer, high density, isotropic, pyrolytic carbon coating is deposited about the first, high density coating, the coated fuel particles are placed in an elongated mold with a resin-carbon mixture and the resulting mixture is polymerized and the fuel composite finally carbonized.

BACKGROUND OF THE INVENTION

The invention described herein was made in the course of, or under, a contract with the U.S. Atomic Energy Commission. It relates generally to coated particles and more particularly to composited pyrolytic carbon coatings on coated fuel particles, which are suitable for consolidation into a carbon-containing matrix fuel composite, and which have excellent resistance to rupture due to stresses induced from particle-matrix interaction.

Particulate nuclear fuels have been widely investigated for various reactor applications. Generally, these fuels comprise a central core of fissile material, surrounded by one or more layers of refractory materials, such as pyrolytic carbon, silicon carbide, etc., which serve as an outer, protective, gas-impermeable coating. One such coated fuel particle, commonly referred to as a duplex-coated particle, consists of a dense actinide oxide core, a first highly porous, pyrolytic carbon coating and an outer, gas-impermeable protective coating of high density, isotropic, pyrolytic carbon. Another coated fuel particle described in U.S. Patent 3,298,921, issued to Jack C. Bokros on Jan. 17, 1967, for "Pyrolytic Carbon Coated Particles for Nuclear Applications," comprised a central fuel core surrounded by a single protective coating of isotropic carbon.

Of recent interest is the incorporation or consolidation of these coated fuel particles into a carbon-containing matrix fuel composite for use, for example, in high temperature gas cooled reactors. Generally, a fuel assembly of this type consists of an elongated graphite block having a multiplicity of cavities in which coated fuel particles are bonded with a carbon-containing resin which is injected therein, polymerized and carbonized. Two primary problems were encountered in preparing these fuel composites. While on the one hand it is desirable to utilize the advantages to be obtained from the coatings described in U.S. application Ser. No. 601,826, filed on Dec. 13, 1966, in the name of Ronald L. Beatty, for "Improved Pyrolytic Carbon Coating Process," in which it is possible to deposit high desnity, isotropic, pyrolytic carbon coatings at a relatively low temperature, it was found that these coatings, while impermeable, have highly porous surfaces which bond readily to the carbon-graphite matrix. During subsequent polymerization and carbonization, the carbon-graphite matrix was found to undergo substantial shrinkage, and due to the bonding of some of the coated particles to the matrix material, the protective coatings of these bonded particles were ruptured by stress-induced cracks which propagated from the matrix material during shrinkage into the pyrolytic carbon coating. On the other hand, certain other particles such as those coated with silicon carbide or high density, anisotropic pyrolytic carbon exhibit highly smooth surfaces which, when incorporated into these fuel composites, polymerized and carbonized, were found to separate from the bonding matrix material rather than to maintain the integrity of the composite. It is highly desirable to provide a coated fuel particle which could be utilized in these carbon-graphite matrix, fuel composites but which would retain the integrity of the protective coating.

This primary objective is achieved by the discovery that an outer, sacrificial, high density, texture, carbon-containing coating disposed about an inner, high density, smooth, carbon-containing coating failed preferentially by cracking and delamination under stresses induced by particle-matrix interaction thereby maintaining the integrity of the coated fuel particle without adversely affecting the structural integrity of the fuel composite. The term "texture coating" is intended to mean a coating that is roughened, having surface-connected porosity, and is characterized by a relatively high surface area. The term "smooth coating" is intended to mean a coating that is highly polished, having a nonporous surface, and is characterized by a relatively low surface area. One embodiment of the invention comprises the disposition of the high density, outer, textured, carbon-containing coating, such as an isotropic pyrolytic carbon coating, hereinafter referred to as the "texture coating" about a conventional, protective, high density, smooth coating, such as silicon carbide. Another embodiment of the invention comprises the disposition of this textured coating about a high density, thin, smooth, anisotropic, pyrolytic carbon coating, hereinafter referred to as the "anisotropic coating," which is placed over a conventional, protective, high density, isotropic, pyrolytic carbon coating. Applicants found, where sol-gel derived UO$_2$ particles coated with a conventional duplex coating were provided with a thin layer of an anisotropic coating followed by an outer layer of a textured coating and consolidated into a carbon-graphite matrix, the outer textured coating served as a sacrificial coating in that stress-induced cracks were, quite unexpectedly, prevented by the cracking and delamination of the sacrificial coating from propagating into the inner coating, thus maintaining the integrity of the coated fuel particle. While applicants do not wish to be bound by any rigid theory, this unexpected beneficial result is believed ascribable to the finding that while the outer textured coating bonded will with the carbon-graphite matrix, due to its roughened surface, the anisotropic coating, having a smooth surface, bonded less strongly with the outer textured coating—though bonding well with the underlying conventional, protective, isotropic, pyrolytic carbon coating—so that the outer texture coating breaks away from the anisotropic coating under induced stresses. In this way the stress-induced cracks propagated through the outer, texture coating but were prevented from propagating into the anisotropic coating and the underlying protective coating.

DESCRIPTION OF THE INVENTION

In a first step of the process a quantity of fuel particles, which may consist of any of the well known core materials such as the oxides, carbides, nitrides of thorium, uranium, plutonium, etc., and which may be coated with one or more conventional protective coatings such as a duplex coating comprising a first highly porous, pyrolytic carbon followed by an outer, high density, isotropic, pyrolytic carbon, are charged into a fluidized bed reactor. These particles are initially contacted with a thermally decomposible hydrocarbon gas to lay down the anisotropic coating. For this, propane, propylene or 1,3-butadiene, for example, are quite satisfactory as the hydrocarbon gas.

The temperature at which the deposition occurs and the supply rate of the hydrocarbon gas is critical to the successful practice of the invention. Applicants have found that this anisotropic coating is attainable, where for example propylene gas is employed, at a supply rate of about 0.10 cc./cm.$^2$/min. and at a deposition temperature of about 1100° C. While the thickness of this anisotropic coating may vary, a thickness of about 5 microns has been found to be qute suitable and is deposited at 1100° C. in 20 minutes at a deposition rate of about 0.2 micron/min.

After the anisotropic coating is deposited, the outer textured coating is deposited. Propane, propylene, or 1,3-butadiene gas may, for example, be employed for this deposition. As with the anisotropic deposition, the temperature at which deposition takes place and the hydrocarbon supply rate are critical. This deposition is conducted at 1250° to 1300° C. and at a supply rate of from 2.0 to 3.5 cc./cm.$^2$/min. For purposes of serving as a sacrificial outer coating when subjected to stresses induced by the particle-matrix interaction the coating thickness may vary widely with a thickness of about 13 microns, which is deposited in 1.5 minutes, being found to be quite satisfactory.

The coated fuel particles may advantageously be consolidated into a carbon-containing matrix fuel assembly comprising an elongated graphite block having a multiplicity of cavities. While in a prior art method the fuel assemblies were fueled by filling each cavity with pyrolytic carbon coated fuel particles, injecting a resin-carbon material into the void volume therein, polymerizing and carbonizing the resin in the cavity to bond the particles together, it has been found that certain distinct advantages may be realized by preparing individual fuel sticks in separate molds, inspecting each one in the polymerized state and loading and sealing the polymerized fuel sticks into the fuel cavities of the graphite block. The process is then completed by subsequent carbonization. This process obviates bonding of the fuel particles to the cavity wall and avoids absorption of some of the resin, during injection, into the graphite block. More importantly, a gap between the fuel stick and the cavity walls may be provided to accommodate radiation shrinkage of the graphite block.

In a preferred form of the process, a mold is filled with the coated fuel particles and a resin-carbon-maleic anhydride mixture is injected under pressure into the mold. The mold and its contents are then heated to polymerize the resin. The polymerized fuel stick is then removed from the mold, inspected nondestructively and inserted into the cavities of the graphite block. After sealing the cavities with carbon plugs, the entire fuel assembly is heated to an elevated temperature to carbonize the resin. While a carbonization temperature of about 1000° C. has been quite satisfactory, it may be desirable to carbonize at a temperature which is greater than the expected service temperature. Whereas, for example, polymerization in the prior art required about 40 hours at 80° C., it was effected in about 2 hours at 80° C. with the use of maleic anhydride. It was unexpectedly found that the pore structure of the carbon-containing matrix, when maleic anhydride was employed, was more uniform than when the maleic anrhydride was omitted.

Having described the invention in general terms the following examples are provided to show with greater particularity the techniques and process parameters employed in the practice of the invention.

EXAMPLE I

Fluidizing bed apparatus, consisting of a 1" ID graphite reaction chamber having a 36° included angle cone at the bottom with a water-cooled injector, was used for applying a first anisotropic coating and an outer textured coating to duplex coated UO$_2$ particles.:

A 25 gram batch of 210–250$\mu$ sol-gel derived UO$_2$ particles was placed in the reactor and deposited with a conventional duplex coating consisting of an inner low density porous carbon coating and an outer high density, isotropic, pyrolytic carbon coating. For this, the reactor was preheated to a temperature of 1050° C. and fluidized with helium at a flow rate of 3 liters/minute until an equilibrium temperature was reached. Then the helium flow was switched to undiluted acetylene gas which was passed into the reactor to initiate the deposition of the inner low density porous carbon coating. This deposition, which was continued for 1 minute until a coating of 24$\mu$ was deposited, was carried out at a supply rate of 3.4 cc./cm.$^2$/min. and a gas pressure of 760 torr. At this stage helium was substituted for the acetylene gas and the reactor temperature equilibrated to a temperature of 1250° C. to deposit the high density, isotropic, pyrolytic carbon coating. Then propylene was substituted for the helium at a supply rate of 3.4 cc./cm.$^2$/min. and this deposition continued for 7 minutes until a deposit of 64$\mu$ was achieved. The BET surface area for this high density, isotropic, pyrolytic carbon coating was determined to be 0.24 m.$^2$/g.

To deposit the anisotropic coating over the duplex coated particles, the propylene supply rate was reduced to 0.11 cc./cm.$^2$/min. and the deposition temperature to 1100° C. This coating phase was continued for about 20 minutes until a deposit of approximately 5$\mu$ thick was deposited at a rate of about 0.2$\mu$/min. The BET surface area for this anisotropic, pyrolytic carbon coating was determined to be 0.02 m.$^2$/g.

The outer textured coating, which has a BET surface area of 0.24 m.$^2$/g., was next deposited by increasing the propylene supply rate to 2.3 cc./cm.$^2$/min. and the deposition temperature to 1300° C. This coating phase was continued for 1.5 minutes until a deposit of about 13$\mu$ was deposited.

EXAMPLE II

A portion of the coated UO$_2$ particles prepared in Example 1 was poured into a cylindrical mold, $\frac{3}{8}$ inch in diameter and 1¾ inches long. A resin-carbon mixture consisting (by weight) of 75% P514 phenolic resin (commercially available from Great Lakes Carbon Company), 15% graphite powder (<325 mesh) and 10% maleic anhydride was injected into the mold to fill the void therein. The resin was then polymerized by baking the mold and its contents at 80° C. for 2 hours. The resulting fuel composites were removed from the mold, examined nondestructively by radiography, and then carbonized.

The carbonized fuel composites were then sectioned, polished and examined by metallography. Although cracks were observed in the sacrificial coating, no cracks were observed in the anisotropic pyrolytic carbon coating.

For comparison, a quantity of duplex coated UO$_2$ particles, without the anisotropic coating and outer textured coating, was fabricated into fuel composites, as described above. The resulting fuel composites were examined by metallography. Numerous fractures or cracks were noted in the protective coatings of the fuel particles contained therein.

EXAMPLE III

A fuel composite was prepared as in Example II using 200–250$\mu$ sol-gel derived ThO$_2$ particles having an outer, high density, smooth, protective silicon carbide coating of 20 microns.

After carbonization, the particles were found to have separated completely from the matrix material, indicating poor bonding of the smooth silicon carbide coatings with the matrix material.

EXAMPLE IV

A 25 gram batch of 200–250μ sol-gel derived $ThO_2$ particles having an outer, high density, smooth, protective, silicon carbide coating of 20 microns were coated with an outer, high density, textured coating employing the same conditions given in Example I. These coated fuel particles were consolidated in a carbon-graphite matrix fuel composition, polymerized, and carbonized as in Example II.

While the fuel composites were not examined by metallography the fuel composites were found to maintain their structural integrity.

What is claimed is:

1. In a process for consolidating discrete fissionable nuclear fuel particles into a carbon-graphite matrix nuclear fuel composite, said fuel particles being coated with a first high density, coating selected from silicon carbide or anisotropic pyrolytic carbon surrounding said particles, the improvement comprising the steps of contacting said particles with a hydrocarbon gas at a temperature within the range of 1250°–1300° C. at a flow rate of from 2.3–3.5 cc./cm.²/min. to deposit an outer, high density, isotropic pyrolytic carbon coating onto said first coating, wherein said outer high density coating, under stresses induced by particle-matrix interaction fails more readily than said first coating, placing the resulting coated fuel particle in an elongated mold, adding a resin-carbon mixture, polymerizing by heating to an elevated temperature said mixture and thereafter carbonizing at an elevated temperature said fuel composit.

2. The process of claim 1 wherein said outer, high density, isotropic pyrolytic carbon coating is deposited using a hydrocarbon gas selected from propane, propylene or 1,3-butadiene, said resin-carbon mixture consists by weight of 75% phenolic resin, 15% graphite and 10% maleic anhydride, said polymerization step is effected at 80° C. in 2 hours and said carbonization is effected at 1000° C.

3. In a process for consolidating discrete fissionable nuclear fuel particles into a carbon-graphite matrix nuclear fuel composite, said fuel particles being coated with a first high density coating selected from silicon carbide or anisotropic pyrolytic carbon surrounding said particles, the improvement which comprises the steps of contacting said particles with a hydrocarbon gas at a temperature within the range of 1250°–1300° C. at a flow rate of from 2.3–3.5 cc./cm.²/min. to deposit an outer, high density, isotropic pyrolytic carbon coating onto said first coating, placing the resulting coated fuel particles in an elongated mold, adding a resin-carbon mixture consisting of 75% phenolic resin, 15% graphic and 10% maleic anhydride, polymerizing by heating to an elevated temperature said mixture, removing the resulting elongated fuel composite, non-destructively inspecting said fuel composite and thereafter carbonizing at an elevated temperature said fuel composite.

4. The process of claim 3 wherein said polymerization step is effected at 80° C. in 2 hours and said carbonization at 1000° C.

References Cited

UNITED STATES PATENTS

| | | | |
|---|---|---|---|
| 3,231,408 | 1/1966 | Huddle | 176—91 X |
| 3,298,921 | 1/1967 | Bokros et al. | 176—67 |
| 3,306,825 | 2/1967 | Finicle | 176—91 X |
| 3,312,597 | 4/1967 | Glueckauf | 176—67 |
| 3,325,363 | 6/1967 | Goeddel et al. | 176—67 |
| 3,335,063 | 8/1967 | Goeddel et al. | 176—67 |
| 3,361,638 | 1/1968 | Bokros et al. | 176—67 |

OTHER REFERENCES

Nuclear Science and Engineering, vol. 20, (1964), pp. 227–234.

REUBEN EPSTEIN, Primary Examiner

U.S. Cl. X.R.

176—67